United States Patent
Yang et al.

(10) Patent No.: US 9,860,844 B2
(45) Date of Patent: Jan. 2, 2018

(54) METHOD AND APPARATUS OF TEMPERATURE CONTROL

(71) Applicant: Beijing Xiaomi Mobile Software Co., Ltd., Beijing (CN)

(72) Inventors: Dongdong Yang, Beijing (CN); Hui Du, Beijing (CN); Linghua Gu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/398,061

(22) Filed: Jan. 4, 2017

(65) Prior Publication Data

US 2017/0265141 A1 Sep. 14, 2017

(30) Foreign Application Priority Data

Mar. 8, 2016 (CN) .......................... 2016 1 0131244

(51) Int. Cl.
*H04W 52/02* (2009.01)
*H04M 1/02* (2006.01)
*G06F 3/0488* (2013.01)
*G06F 1/32* (2006.01)

(52) U.S. Cl.
CPC ...... *H04W 52/0254* (2013.01); *G06F 1/3265* (2013.01); *G06F 3/0488* (2013.01); *H04M 1/0266* (2013.01); *H04W 52/027* (2013.01); *H04W 52/0264* (2013.01)

(58) Field of Classification Search
CPC    H04W 52/0254; H04W 24/02; H04W 52/027
USPC ... 455/574, 572, 573, 550.1, 566, 73, 556.1, 455/115.1, 90.1–90.3, 575.1, 343.1–343.4
See application file for complete search history.

(56) References Cited

U.S. PATENT DOCUMENTS

| 2012/0270606 A1* | 10/2012 | Kim ........................ H04M 1/22 |
| | | 455/566 |
| 2012/0282882 A1* | 11/2012 | Jin ........................... H04M 1/66 |
| | | 455/404.1 |
| 2016/0077578 A1* | 3/2016 | Kuo ...................... G06F 1/3296 |
| | | 713/323 |

* cited by examiner

*Primary Examiner* — Keith Ferguson
(74) *Attorney, Agent, or Firm* — Finnegan, Henderson, Farabow, Garrett & Dunner LLP

(57) ABSTRACT

A temperature control method is provided. The method may include determining a present state of a user interface of a terminal when a present temperature of the terminal reaches a predetermined temperature threshold, and performing a corresponding temperature control strategy on the terminal according to the present state of the user interface. The present state of the user interface may be an interacting state or a non-interacting state.

17 Claims, 7 Drawing Sheets

US 9,860,844 B2

METHOD AND APPARATUS OF TEMPERATURE CONTROL

CROSS REFERENCE TO RELATED APPLICATION

This application is based upon and claims priority to Chinese Patent Application Serial No. 201610131244.2, filed on Mar. 8, 2016, the entire contents of which are incorporated herein by reference.

TECHNICAL FIELD

The present disclosure generally relates to communication technology, and more particularly, to a method and apparatus for temperature control.

BACKGROUND

Temperature of a terminal, for example a mobile phone, may rise continuously when the terminal is used. A user of the terminal may feel uncomfortable if the temperature increases to a certain degree. Therefore, heat generated from the terminal needs to be dissipated timely in order to control the temperature of the terminal.

Some conventional technologies of controlling a terminal temperature include limiting resources of some components in the terminal to reduce a power consumption of the terminal when the terminal temperature increases to a certain degree. This may facilitate maintaining the terminal temperature to be in a comfortable range for a user. Such conventional technologies, however, may adversely impact normal operation of the terminal. For example, the user may desire to use a terminal component that is restricted to access computing resources due to the uncomfortable temperature.

The method and device of the present disclosure is directed towards overcoming one or more of the problems set forth above and/or other problems of the conventional technologies.

SUMMARY

In one aspect, the present disclosure is directed to a temperature control method. The method may include determining a present state of a user interface of a terminal when a present temperature of the terminal reaches a predetermined temperature threshold, and performing a corresponding temperature control strategy on the terminal according to the present state of the user interface. The present state of the user interface may be an interacting state or a non-interacting state.

In another aspect, the present disclosure is directed to a temperature control apparatus. The apparatus may include a processing component and a storage component configured to store instructions executable by the processing component. The processing component may be configured to determine a present state of a user interface of a terminal when a present temperature of the terminal reaches a predetermined temperature threshold, and to perform a corresponding temperature control strategy on the terminal according to the present state of the user interface. The present state of the user interface may be an interacting state or a non-interacting state. The predetermined temperature threshold is one of a first predetermined temperature threshold and a second predetermined temperature threshold. The first predetermined temperature threshold may be greater than the second predetermined temperature threshold.

In yet another aspect, the present disclosure is directed to a non-transitory computer-readable storage medium having stored therein instructions that, when executed by a processor of an apparatus, cause the apparatus to perform a temperature control method. The method may include determining a present state of a user interface of a terminal when a present temperature of the terminal reaches a predetermined temperature threshold, and performing a corresponding temperature control strategy on the terminal according to the present state of the user interface. The present state of the user interface is an interacting state or a non-interacting state.

DETAILED DESCRIPTION

Figure 1:
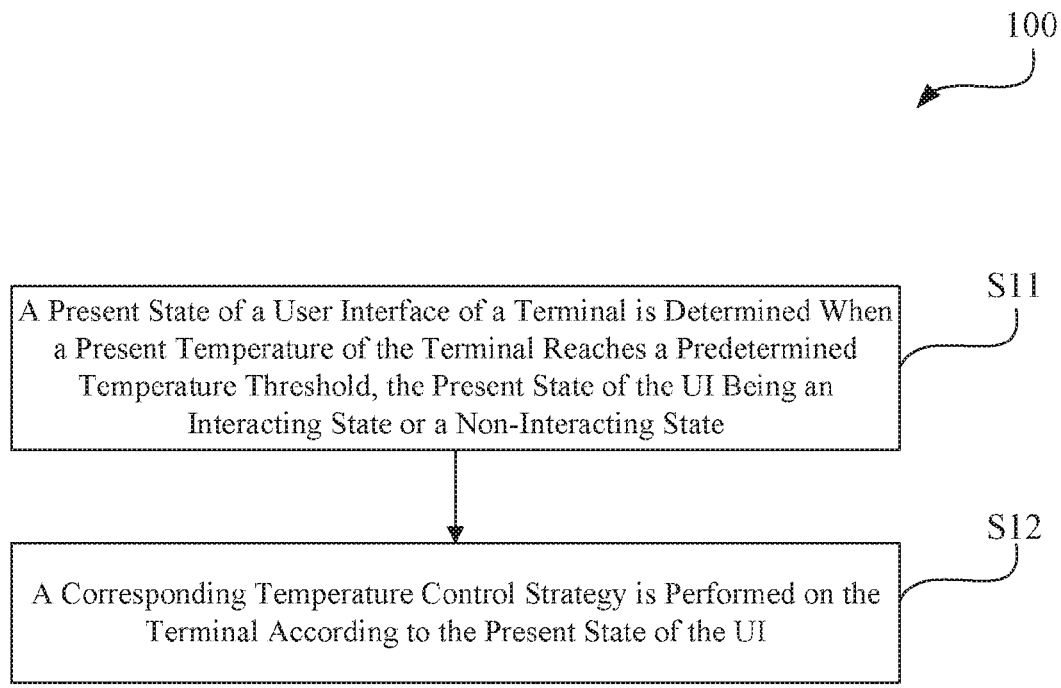
FIG. 1 is a flow chart for a temperature control method according to an exemplary embodiment.

Reference will now be made in detail to exemplary embodiments, examples of which are illustrated in the accompanying drawings. The following description refers to the accompanying drawings in which the same reference numeral represents the same or similar element unless otherwise represented. The implementations set forth in the following description of exemplary embodiments do not represent all implementations consistent with the disclosure. Instead, they are merely exemplary methods, systems and apparatuses consistent with aspects related to the disclosure as recited in the appended claims.

FIG. 1 is a flow chart for a temperature control method 100 according to an exemplary embodiment. As shown in FIG. 1, temperature control method 100, when implemented in a terminal, includes the following steps.

In step S11, a present state of a user interface (UI) of the terminal is determined, when a present temperature of the terminal reaches a predetermined temperature threshold. The present state of the UI may be one of an interacting state and a non-interacting state.

The present temperature of the terminal may be determined by continuously detecting temperatures of each heat-generating source in the terminal. For example, a temperature of the terminal may be detected by disposing a temperature sensor within the terminal. The heat-generating source in the terminal may include a processor, a charging module, a backlight module, and the like.

When the present temperature of the terminal reaches the predetermined temperature threshold, it is determined whether the terminal is operated by a user. The present state of the UI of the terminal is determined as the interacting state if the user is operating the terminal; otherwise, the present state of the UI of the terminal is determined as the non-interacting state.

In step S12, a corresponding temperature control strategy is performed on the terminal according to the present state of the UI determined from step S11.

In the illustrated embodiment, by considering both the present temperature of the terminal and the determined present state of the UI, a temperature control strategy is performed on the terminal. The temperature control strategy varies in response to a corresponding present temperature of the terminal and a corresponding present state of the UI.

In some embodiments, a user of the terminal may be provided an option whether or not temperature control method 100 is activated in the terminal. For example, temperature control method 100 is automatically performed in the terminal, if the user selects to activate temperature control method 100. Alternatively, temperature control method 100 may be specified to be automatically performed in the terminal during a particular time period, for example a heavy usage time period determined based on the user's usage history. Alternatively, temperature control method 100 may be specified to be automatically performed in the terminal upon triggering of a particular event.

In the exemplary embodiment, temperature of the terminal is controlled according to the present temperature of the terminal and the present state of the UI of the terminal. Thus, the temperature control strategy may vary with the present temperature of the terminal and the present state of the UI. In this way, the temperature of the terminal can be controlled based on an actual usage situation of the terminal. Accordingly, adverse effect on the terminal operation by a user may be reduced while a temperature control strategy is performed in the terminal, thereby improving the user's positive experience.

Figure 2:
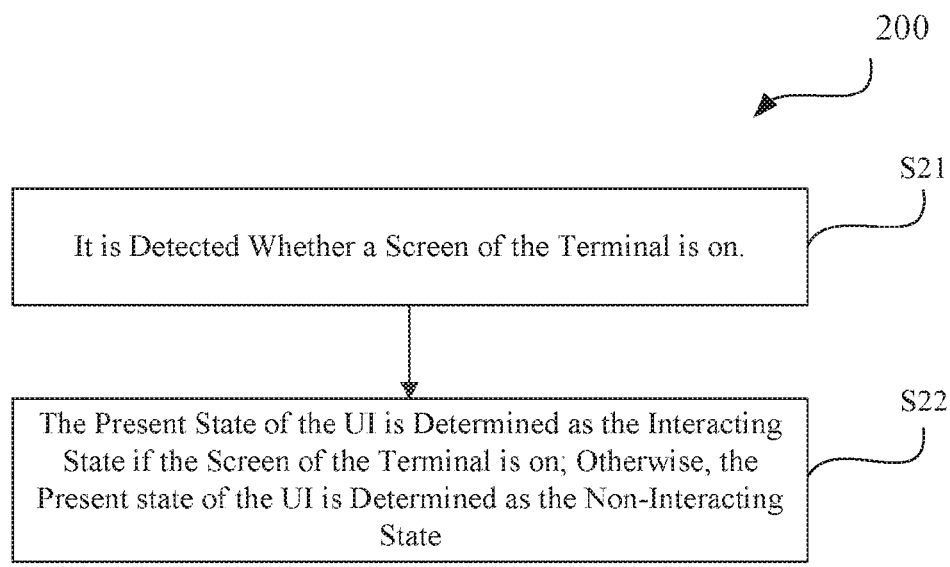
FIG. 2 is a flow chart for a temperature control method according to another exemplary embodiment.

FIG. 2 is a flow chart for a temperature control method 200 according to another exemplary embodiment. Temperature control method 200 may be implemented in step S11 of temperature control method 100 (FIG. 1) for determining a present state of the UI.

Referring to FIG. 2, in step S21, it is detected whether a screen of the terminal is on. Whether the screen of the terminal is on may be determined by detecting that the screen is locked or unlocked. The screen of the terminal is off if the screen is locked. And the screen of the terminal is on if the screen is unlocked.

Alternatively, whether the screen of the terminal is on may be determined by detecting that the screen of the terminal is bright or dark. It is determined that the screen of the terminal is on if the screen is bright. And it is determined that the screen of the terminal is off if the screen is dark.

Further to the above detection, a time factor may be considered. For example, it may be determined that the screen of the terminal is off if the screen turns dark very soon after being bright. Thus, it may be determined that the screen of the terminal is on only when a time period, during which the screen of the terminal is unlocked or bright, is greater than a predetermined time period. Otherwise, it is determined that the screen of the terminal is off.

In step S22, the present state of the UI is determined as the interacting state if the screen of the terminal is determined to be on in step S21; otherwise, the present state of the UI is determined as the non-interacting state.

Specifically, it is indicated that the user is operating the terminal if the screen is on, and thus the present state of the UI may be determined as the interacting terminal. It is indicated that that the user is not operating the terminal directly if the screen is off, and thus the present state of the UI may be determined as the non-interacting state.

In a process that the terminal is used by a user, it is generally considered that the user is operating the terminal if the screen of the terminal is unlocked or is bright. Therefore, in this exemplary embodiment, correctness of determining the present state of the UI may be ensured based on whether the screen of the terminal is on.

Figure 3:
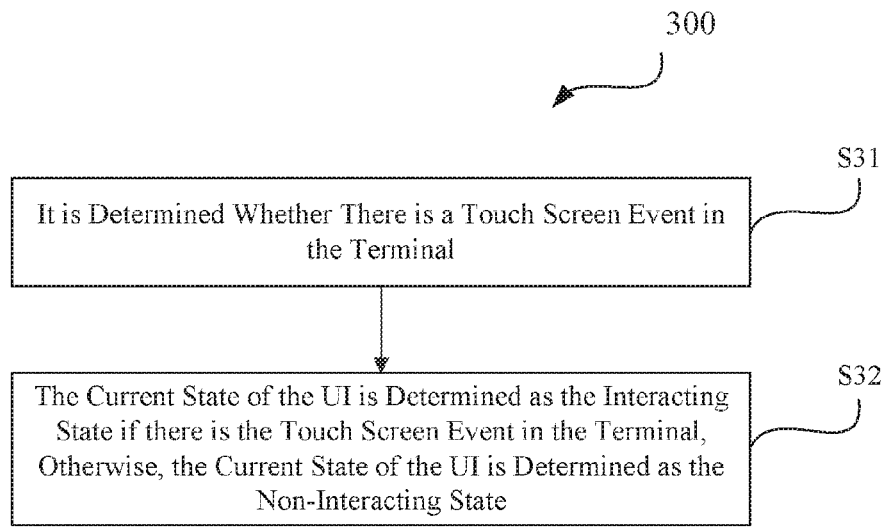
FIG. 3 is a flow chart for a temperature control method according to another exemplary embodiment.

FIG. 3 is a flow chart for a temperature control method 300 according to another exemplary embodiment. Temperature control method 300 may be implemented in step S11 of temperature control method 100 (FIG. 1) for determining a present state of the UI.

Referring to FIG. 3, in step S31, it is determined whether a screen touch event occurs in the terminal. Namely, it is detected whether a user is touching the screen.

In step S32, the present state of the UI is determined as the interacting state if the screen touch event occurs in the terminal; otherwise, the present state of the UI is determined as the non-interacting state.

It may be determined that a user is operating the terminal when the user is touching the screen. Based on such determination, the present state of the UI may be determined as the interacting state; otherwise, the present state of the UI may be determined as the non-interacting state.

Figure 4:
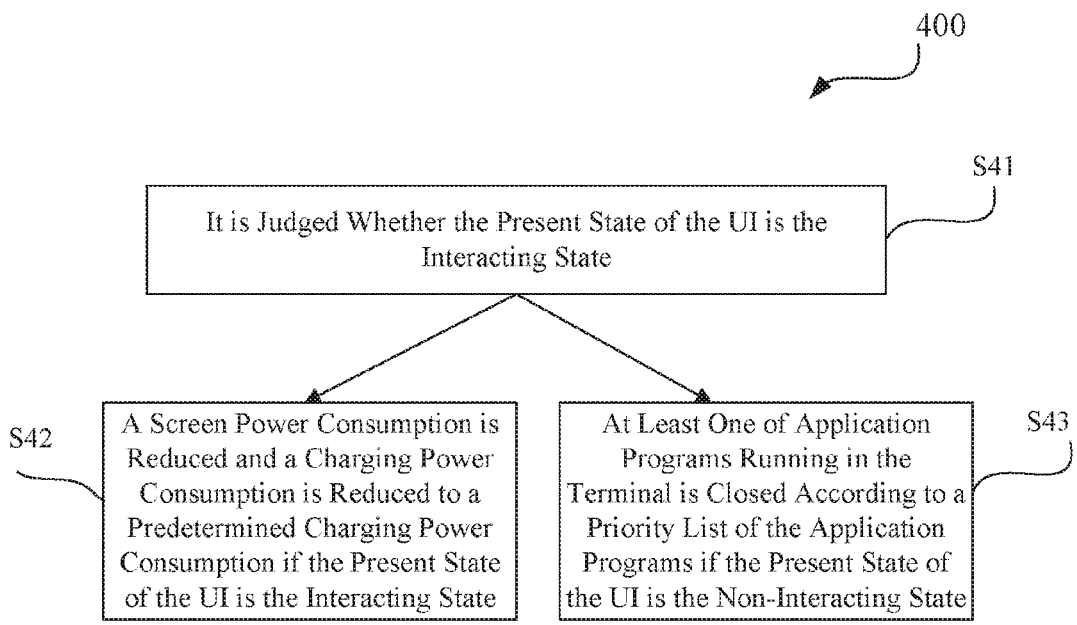
FIG. 4 is a flow chart for a temperature control method according to another exemplary embodiment.

Accordingly, in this exemplary embodiment, the present state of the UI of the terminal may be determined more directly and precisely via a screen touch event. FIG. 4 is a flow chart for a temperature control method 400 according to another exemplary embodiment. Temperature control method 400 may be partially implemented in step S12 of temperature control method 100 (FIG. 1) for performing a temperature control strategy. For example, when the present temperature of the terminal reaches a first predetermined temperature threshold, step S12 of temperature control method 100 may further include one or more steps of the followings.

In step S41, it is determined whether the present state of the UI is the interacting state.

When the present temperature of the terminal reaches the first predetermined temperature threshold, power consumption of a processor is not limited. Rather, the present state of the UI is determined. Namely, it is determined whether the user is operating the terminal.

In step S42, if the present state of the UI is determined as the interacting state, power consumption of a screen of the terminal is reduced and charging power consumption of the terminal is reduced to a predetermined charging power consumption. In this exemplary embodiment, when the present temperature of the terminal reaches the first predetermined threshold, the processor power consumption is not limited if the user is operating the terminal. The screen power consumption and the charging power consumption are instead reduced. As such, not only the temperature control but also a normal operation of the terminal by the user are ensured. In addition, an assumption for reducing the charging power consumption is that the terminal is being charged, that is, if the present state of the UI is the interacting state while the terminal is being charged, then the charging power consumption is reduced.

In step S43, at least one of application programs running in the terminal is closed according to a priority list of the application programs, if the present state of the UI is the non-interacting state. When the present temperature of the terminal reaches the first predetermined temperature threshold, the temperature control may be realized by limiting the processor power consumption, if the user is not operating the terminal directly. Specifically, one or more application programs running in the terminal may be closed based on the priority list such that the processor power consumption may be reduced.

In this exemplary embodiment, when the present temperature of the terminal reaches a certain degree, different temperature control strategies may be performed according to the present state of the UI of the terminal. If the present state of the UI is the interacting state, instead of limiting the processor power consumption, the screen power consumption and the charging power consumption are limited to realize the temperature control, such that the terminal can run smoothly while the user is operating the terminal. If the present state of the UI is the non-interacting state, the processor power consumption may be limited directly to realize the temperature control. Thus, temperature control of the terminal may be performed according to the actual usage situation of a user, such that adverse impact on a normal operation of the terminal by the user may be reduced when a temperature control strategy is performed, thereby largely improving the user's positive experience.

Figure 5:
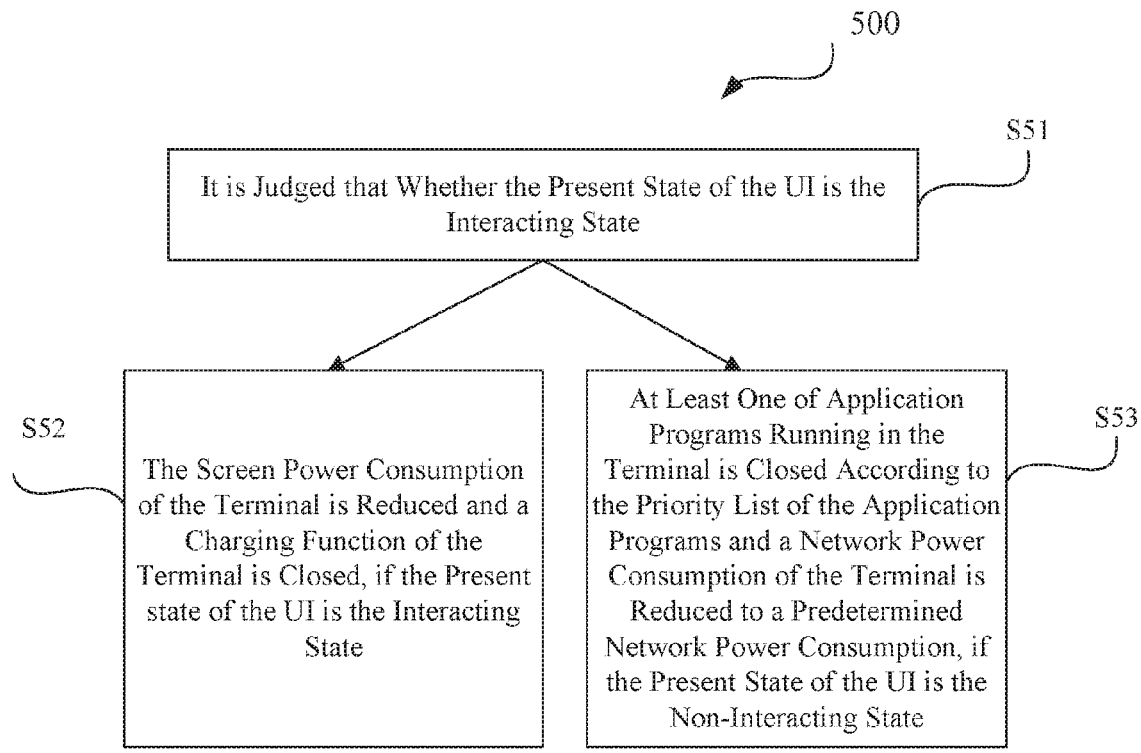
FIG. 5 is a flow chart for a temperature control method according to another exemplary embodiment.

FIG. 5 is a flow chart for a temperature control method 500 according to another exemplary embodiment. Temperature control method 500 may be partially implemented in step S12 of temperature control method 100 (FIG. 1) for performing a temperature control strategy. For example, when the present temperature of the terminal reaches a second predetermined temperature threshold, step S12 of temperature control method 100 may further include one or more steps of the followings.

In step S51, it is determined whether the present state of the UI is the interacting state.

In the illustrated embodiment, the second predetermined temperature threshold is greater than the first predetermined temperature threshold. When the present temperature of the terminal reaches the second predetermined temperature threshold, it is indicated that the temperature of the terminal reaches a higher level. In such situation, the above temperature control strategy may be unable to control the temperature of the terminal in a reasonable temperature range effectively. Therefore, a more aggressive temperature control strategy may be desired.

In step S52, the screen power consumption of the terminal is reduced and a charging function of the terminal is closed, if the present state of the UI is the interacting state. When the temperature of the terminal reaches a higher level while the user is operating the terminal, in addition to reducing the screen power consumption of the terminal, the charging function needs to be closed such that the charging power consumption is reduced to zero to ensure the temperature control. As such, the normal operation of the terminal by the user is warranted to a maximum degree, but also the temperature control is ensured.

In addition, an assumption for closing the charging function is that the terminal is being charged, that is, if the present state of the UI is the interacting state and the terminal is being charged, the charging function of the terminal is closed.

In step S53, at least one of the application programs running in the terminal is closed according to a priority list of application programs, and a network power consumption of the terminal is reduced to a predetermined network power consumption threshold, if the present state of the UI is the non-interacting state. When the temperature of the terminal reaches a higher level while the user is not operating the terminal, in addition to closing one or more of the application programs running in the terminal, the network power consumption needs to be limited. That is, the network function is also limited (for example, music or video download via the network is limited) to ensure the temperature control.

In this exemplary embodiment, when the present temperature value of the terminal reaches a higher level, a different temperature control strategy may be performed according to the present state of the UI of the terminal. If the present state of the UI is the interacting state, instead of limiting the processor power consumption, the screen power consumption is limited and the charging power consumption is closed to realize the temperature control. Accordingly, a normal operation of the terminal by a user may run smoothly when the user is operating the terminal. If the current state of the UI is the non-interacting state, the processor power consumption and the network power consumption may be limited directly to realize the temperature control. Thus, temperature control of the terminal may be performed according to the actual usage situation of a user, such that adverse impact on a normal operation of the terminal by the user may be significantly reduced when a temperature control strategy is performed, thereby largely improving the user's positive experience.

In the above exemplary embodiments, the priority list of application programs has existed when at least one of the application programs running in the terminal is closed according to the priority list. Namely, the priority list needs to be predetermined. A default priority list may be generated by the terminal. Alternatively, the priority list may be generated by the user, for example by providing input information to the terminal.

Figure 6:
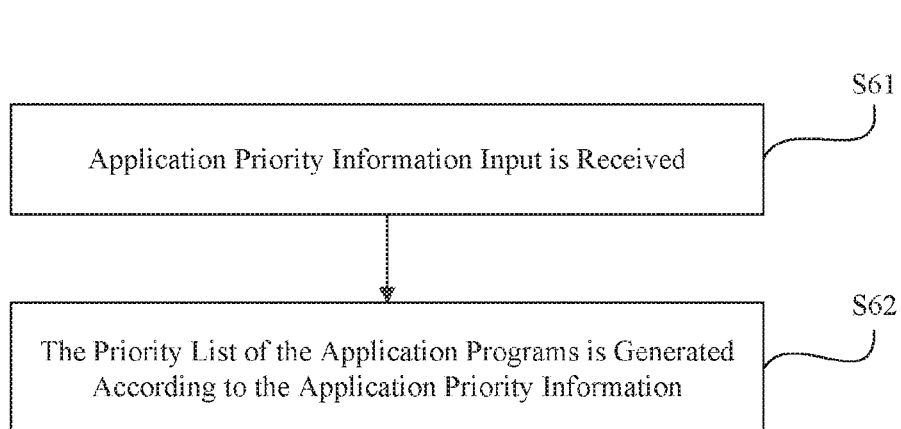
FIG. 6 is a flow chart for a temperature control method according to another exemplary embodiment.

FIG. 6 is a flow chart for a temperature control method 600 according to another exemplary embodiment. Temperature control method 600 may be used for determining a priority list by a user.

In step S61, input of priority information by a user for application programs is received. The terminal may provide a function to the user for setting the priority of the application programs. For example, the terminal may provide icons or a name listing of all application programs in the terminal such that the user may input the priority information according to the icons and the name listing.

In step S62, a priority list of the application programs is generated according to the application priority information input by the user. The priority list is configured to indicate a priority order of the application programs. At least one of the application programs running in the terminal may be closed in the priority order, for example from a low priority to a high priority.

In this exemplary embodiment, the application priority information is set by the user. As such, closing of the application programs by the terminal according to the application priority information may reflect the user's demand accurately. Accordingly, an application program considered as important or critical by the user, may be prevented from being closed incorrectly or accidentally, thereby improving the user's positive experience.

In some embodiments, reducing the screen power consumption of the terminal may include reducing screen brightness of the terminal to a predetermined screen brightness, and/or closing one or more screen key lights of the terminal. In addition, the screen power consumption may be reduced differently when the present temperature of the terminal reaches the first predetermined temperature threshold compared to the reduction of the screen power consumption when the present temperature of the terminal reaches the second predetermined temperature threshold. For example, the screen power consumption may be reduced to a lesser degree when the present temperature of the terminal reaches the first predetermined temperature threshold. Whereas the screen power consumption may be reduced more when the present temperature of the terminal reaches the second predetermined temperature threshold.

In the exemplary embodiment, the screen power consumption is reduced by reducing the brightness of the screen and/or closing the screen key light. As such, the temperature control of the terminal may be performed by reduction of the power consumption without influencing the user experience.

Figure 7:
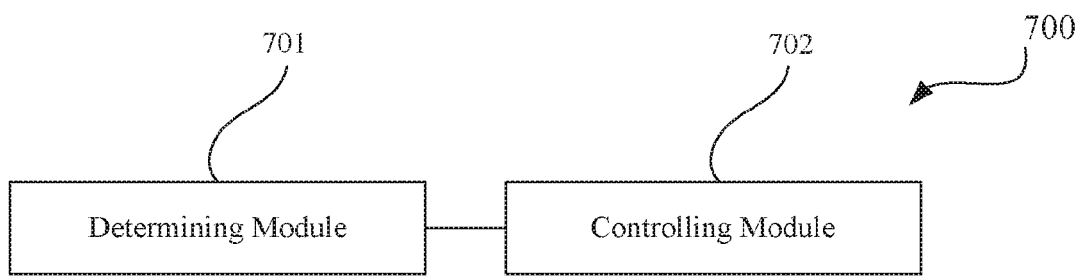
FIG. 7 is a block diagram for a temperature control apparatus according to an exemplary embodiment.

FIG. 7 is a block diagram for a temperature control apparatus 700 according to an exemplary embodiment. As shown in FIG. 7, apparatus 700 includes a determining module 701 and a controlling module 702.

Determining module 701 is configured to determine a present state of a UI of a terminal when a present temperature of the terminal reaches a predetermined temperature threshold. The present state of the UI includes an interacting state and a non-interacting state. Controlling module 702 is configured to perform a corresponding temperature control strategy on the terminal according to the present state of the UI determined by determining module 701.

Figure 8:
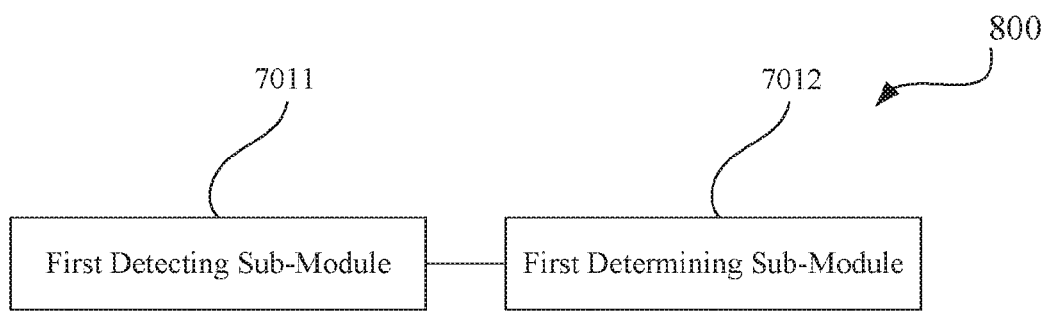
FIG. 8 is a block diagram for a temperature control apparatus according to another exemplary embodiment.

FIG. 8 is a block diagram for a temperature control apparatus 800 according to another exemplary embodiment. Temperature control apparatus 800 may be implemented in determining module 701 of temperature control apparatus 700. As shown in FIG. 8, determining module 701 includes a first detecting sub-module 7011 and a first determining sub-module 7012.

First detecting sub-module 7011 is configured to detect whether a screen of the terminal is on. First determining sub-module 7012 is configured to determine the present state of the UI as the interacting state if the screen of the terminal is on, otherwise, to determine the present state of the UI as the non-interacting state.

Figure 9:
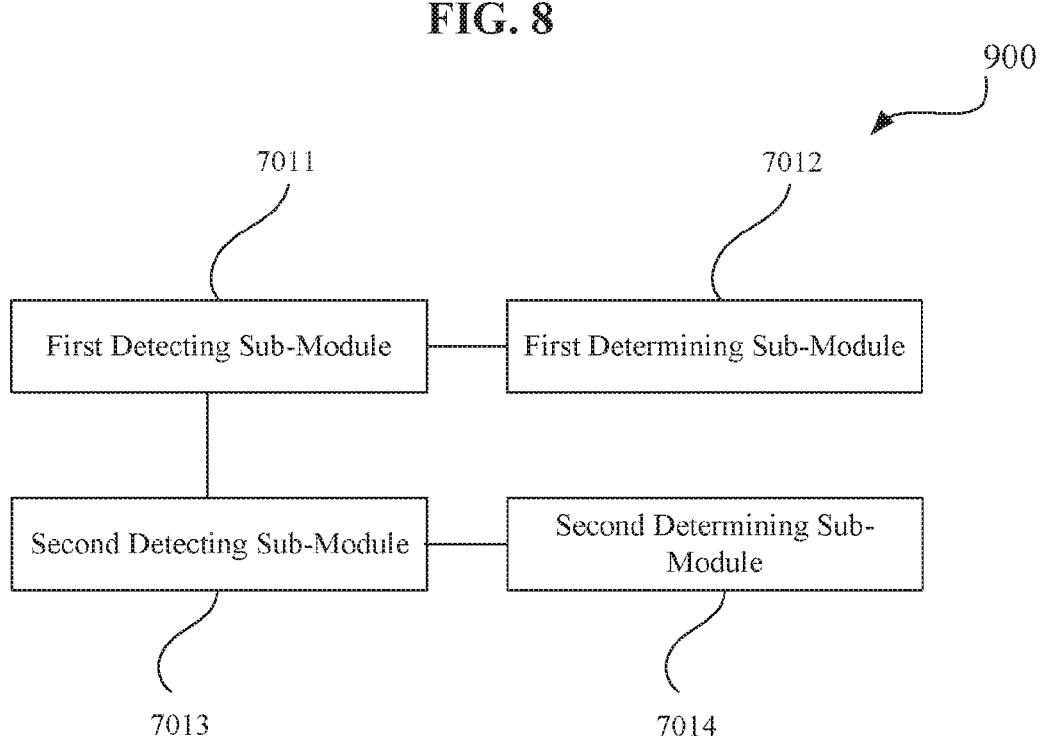
FIG. 9 is a block diagram for a temperature control apparatus according to another exemplary embodiment.

FIG. 9 is a block diagram for a temperature control apparatus 900 according to another exemplary embodiment. Temperature control apparatus 900 may be implemented in determining module 701 of temperature control apparatus 700. As shown in FIG. 9, determining module 701 further includes a second detecting sub-module 7013 and a second determining sub-module 7014, in addition to first detecting sub-module 7011 and first determining sub-module 7012.

Second detecting sub-module 7013 is configured to detect whether there is a screen touch event in the terminal. Second determining sub-module 7014 is configured to determine the present state of the UI as the interacting state if there is a screen touch event in the terminal, otherwise, to determine the present state of the UI as the non-interacting state.

Figure 10:
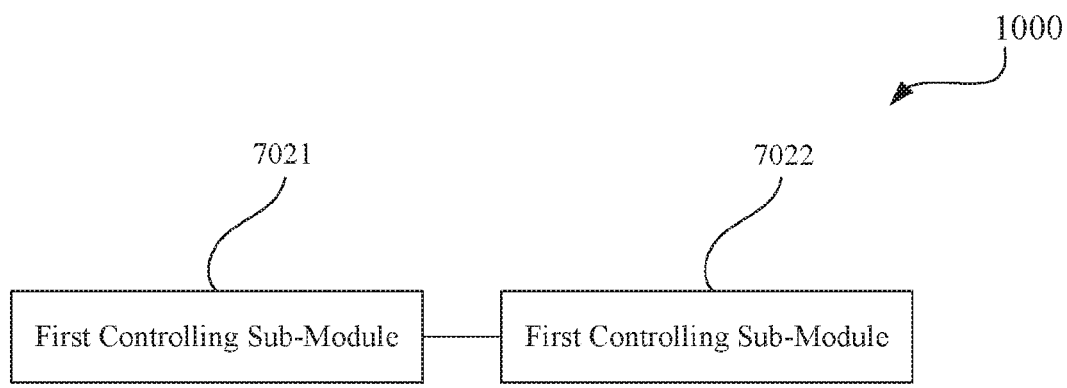
FIG. 10 is a block diagram for a temperature control apparatus according to another exemplary embodiment.

FIG. 10 is a block diagram for a temperature control apparatus 1000 according to another exemplary embodiment. Temperature control apparatus 1000 may be implemented in controlling module 702 of temperature control apparatus 700. As shown in FIG. 10, controlling module 702 includes a first controlling sub-module 7021 and a second controlling sub-module 7022.

First controlling sub-module 7021 is configured to reduce a screen power consumption of the terminal and to reduce a charging power consumption of the terminal to a predetermined charging power consumption threshold, if the present state of the UI is the interacting state when the present temperature of the terminal reaches a first predetermined temperature threshold.

Second controlling sub-module 7022 is configured to close at least one of application programs running in the terminal according to a priority list of the application programs, if the present state of the UI is the non-interacting state when the present temperature of the terminal reaches a first predetermined temperature threshold.

Figure 11:
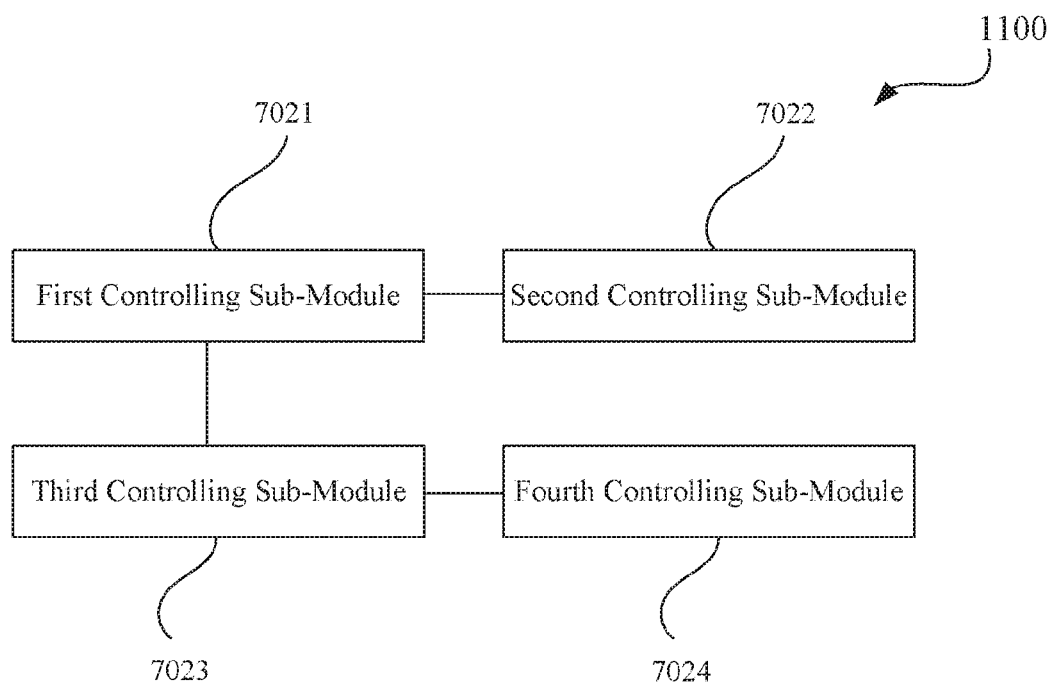
FIG. 11 is a block diagram for a temperature control apparatus according to another exemplary embodiment.

FIG. 11 is a block diagram for a temperature control apparatus 1100 according to another exemplary embodiment. Temperature control apparatus 1100 may be implemented in controlling module 702 of temperature control apparatus 700. As shown in FIG. 11, controlling module 702 further includes a third controlling sub-module 7023 and a fourth controlling sub-module 7024, in addition to first controlling sub-module 7021 and second controlling sub-module 7022.

Third controlling sub-module 7023 is configured to reduce the screen power consumption of the terminal and to close a charging function of the terminal, if the present state of the UI is the interacting state when the present temperature of the terminal reaches a second predetermined temperature threshold.

Fourth controlling sub-module 7024 is configured to close at least one of the application programs running in the terminal according to the priority list of the application programs and to reduce a network power consumption of the terminal to a predetermined network power consumption threshold, if the present state of the UI is the non-interacting state when the present temperature of the terminal reaches a second predetermined temperature threshold.

Figure 12:
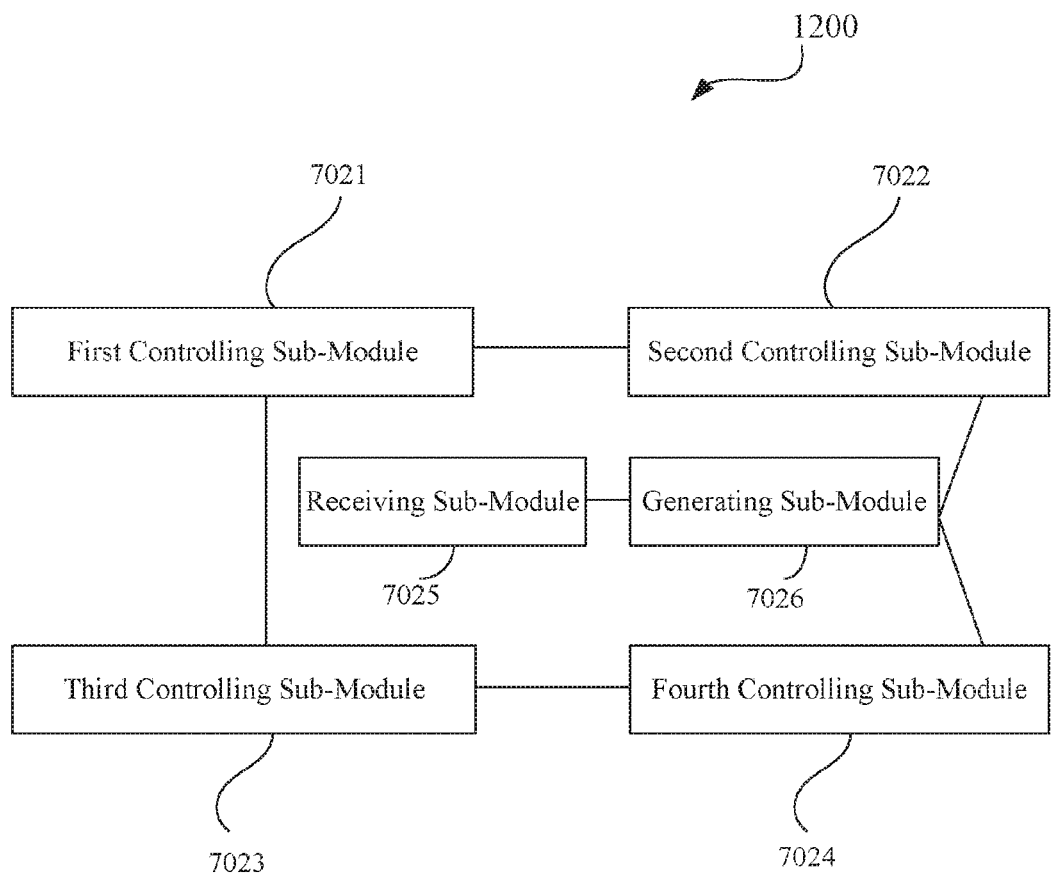
FIG. 12 is a block diagram for a temperature control apparatus according to another exemplary embodiment.

FIG. 12 is a block diagram for a temperature control apparatus 1200 according to another exemplary embodiment. Temperature control apparatus 1200 may be implemented in controlling module 702 of temperature control apparatus 700. As shown in FIG. 12, controlling module 702 includes a receiving sub-module 7025 and a generating sub-module 7026, in addition to first controlling sub-module 7021, second controlling sub-module 7022, third controlling sub-module 7023, and fourth controlling sub-module 7024.

Receiving sub-module 7025 is configured to receive application priority information input by a user, before second controlling sub-module 7022 or fourth controlling sub-module 7024 closes at least one of the application programs running in the terminal according to a priority list of the application programs. Generating sub-module 7026 is configured to generate the priority list of the application programs according to the application priority information. The priority list of application programs is configured to indicate a priority order of the application programs. At least one of the application programs running in the terminal is closed in the priority order, for example from a low priority to a high priority.

In some embodiments, first controlling sub-module 7021 is configured to reduce a screen brightness of the terminal to a predetermined screen brightness, and/or to close a screen key light of the terminal. In some embodiments, third controlling sub-module 7023 is configured to reduce a screen brightness of the terminal to a predetermined screen brightness, and/or to close a screen key light of the terminal.

With respect to the apparatuses in the above exemplary embodiments, operation details for each individual module therein have been described in the corresponding exemplary embodiments of methods.

Figure 13:
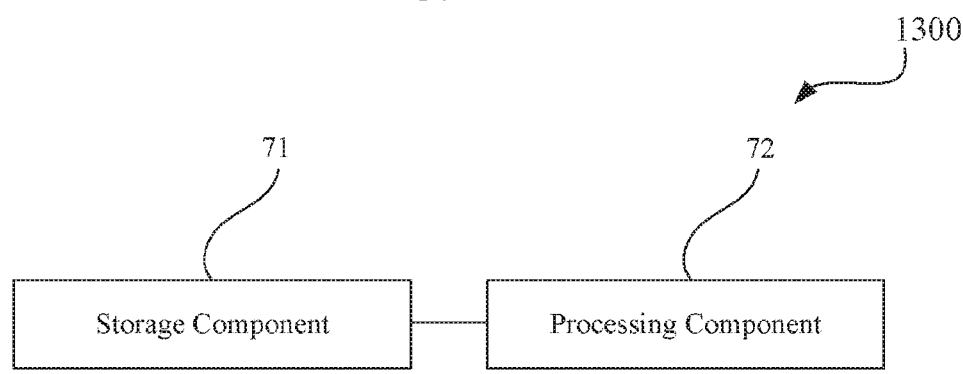
FIG. 13 is a block diagram for a terminal according to an exemplary embodiment.

FIG. 13 is a block diagram for a terminal 1300 according to an exemplary embodiment. As shown in FIG. 13, terminal 1300 may include a storage component 71 and a processing component 72. Storage component 71 is configured to store instructions executable by processing component 72. Processing component 72 is configured to determine a present state of a UI of a terminal when a present temperature of the terminal reaches a predetermined temperature threshold, and to perform a corresponding temperature control strategy on the terminal according to the determined present state of the UI. The present state of the UI may be one of an interacting state and a non-interacting state.

Processing component 72 may be a central processing unit (CPU), a digital signal processor (DSP), an application specific integrated circuit (ASIC), or any other general processor known in the art. The general processor may be a microprocessor, or any other regular processors known in the art. Storage component 71 may be a read-only memory (ROM), a random access memory (RAM), a flash memory, a compact disk, a hard disk, a floppy disk, a solid state disk, or a subscriber identity module (SIM) card. A SIM card, also known as a smart card in the art, is generally provided for a digital mobile phone for, for example, storing personal data of a user of the digital mobile phone, encryption keys, and/or a telephone dictionary of the user. The disclosed methods in the present disclosure may be implemented by a hardware processor or a combination of hardware and software modules in a processor.

Figure 14:
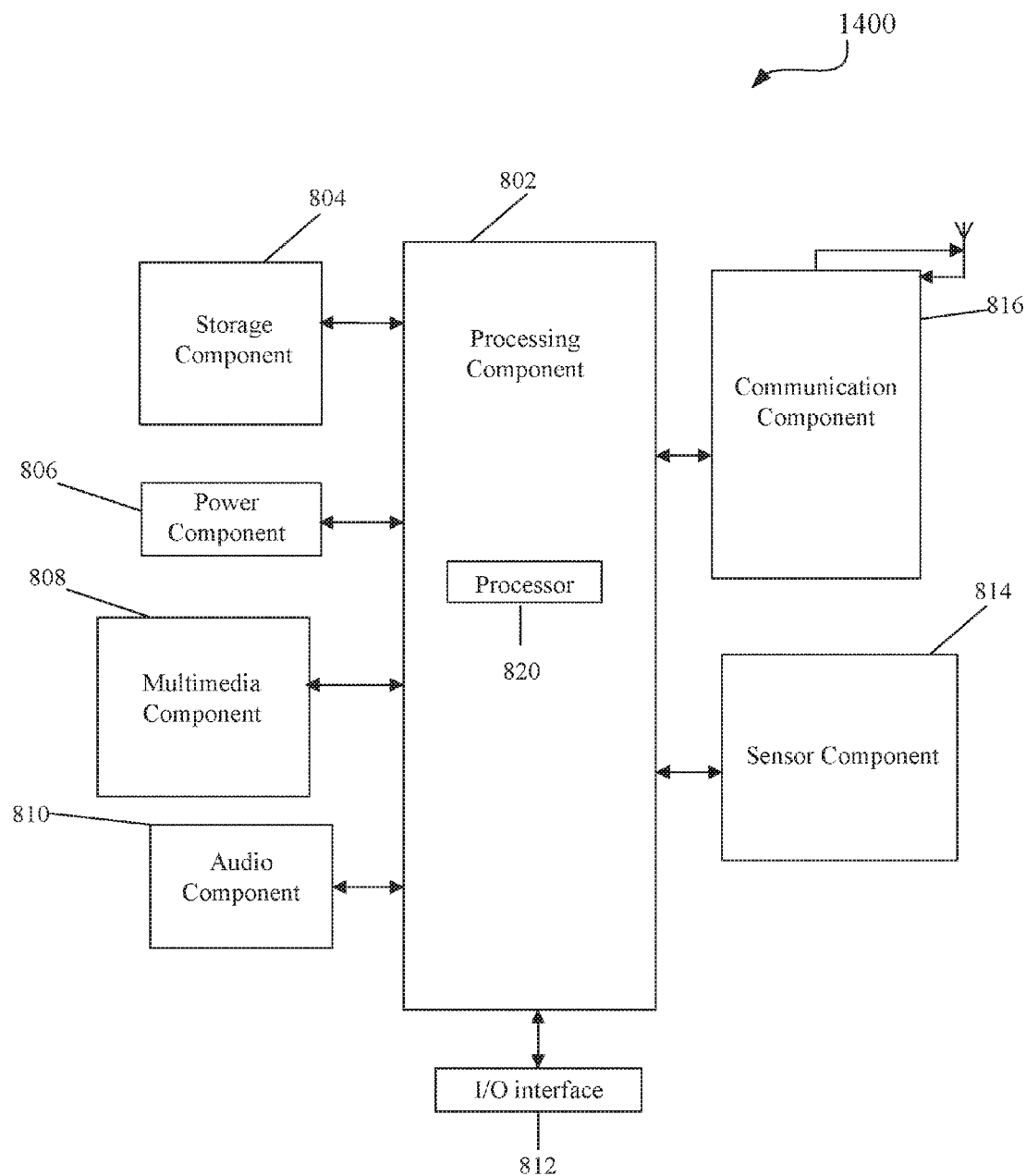
FIG. 14 is a block diagram for a temperature control apparatus according to an exemplary embodiment.

FIG. 14 is a block diagram for a temperature control apparatus 1400 according to an exemplary embodiment. For example, apparatus 1400 may be a mobile phone, a computer, a digital broadcasting terminal, a messaging device, a game console, a tablet device, a medical device, fitness equipment, a Personal Digital Assistant (PDA), and the like.

Referring to FIG. 14, apparatus 1400 may include the following one or more components: a processing component 802, a storage component 804, a power component 806, a multimedia component 808, an audio component 810, an input/output (I/O) interface 812, a sensor component 814, and a communication component 816.

Processing component 802 typically controls overall operations of apparatus 1400, such as operations associated with display, telephone calls, data communications, camera operations, and recording operations. Processing component 802 may include one or more processors 820 for executing instructions to perform all or part of the above described methods. Moreover, processing component 802 may include one or more modules that facilitate interactions between processing component 802 and other components. For instance, processing component 802 may include a multimedia module to facilitate interactions between multimedia component 808 and processing component 802.

Storage component 804 is configured to store various types of data to support operation of apparatus 1400. Examples of such data include instructions for any applications or methods operated on apparatus 1400, contact data, phonebook data, messages, pictures, video, etc. Storage component 804 may include any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic storage device, a flash memory, a magnetic or optical disk.

Power component 806 provides power to various components of apparatus 1400. Power component 806 may include a power management system, one or more power sources, and/or any other components associated with generation, management, and distribution of power in apparatus 1400.

Multimedia component 808 includes a screen providing an output interface between apparatus 1400 and a user. In some embodiments, the screen may include a liquid crystal display (LCD) and a touch panel (TP). If the screen includes a touch panel, the screen may be implemented as a touch screen to receive input signals from the user. The touch panel may include one or more touch sensors to sense touches, swipes, and other gestures on the touch panel. The touch sensors may not only sense a boundary of a touch or swipe action, but also sense a duration time and a pressure associated with the touch or swipe action. In some embodiments, multimedia component 808 includes a front camera and/or a rear camera. The front camera and/or the rear camera may receive external multimedia data while apparatus 1400 is in an operation mode, such as a photographing mode or a video mode. Each of the front camera and the rear camera may be a fixed optical lens system or have focus and optical zoom capability.

Audio component 810 is configured to output and/or input audio signals. For example, audio component 810 may include a microphone (MIC) configured to receive an external audio signal when apparatus 1400 is in an operation mode, such as a call mode, a recording mode, or a voice recognition mode. The received audio signal may be further stored in storage component 804 or transmitted via the communication component 816. In some embodiments, audio component 810 may further include a speaker to output audio signals.

I/O interface 812 provides an interface for processing component 802 and peripheral interface modules. The peripheral interface modules may include a keyboard, a click wheel, buttons, and the like. The buttons may include, but are not limited to, a home button, a volume button, a starting button, and a locking button.

Sensor component 814 includes one or more sensors to provide status assessments of various aspects of apparatus 1400. For example, sensor component 814 may detect an open/closed status of apparatus 1400, and relative positioning of components (e.g., the display and the keypad of apparatus 1400). Sensor component 814 may also detect a change in position of apparatus 1400 or of a component in apparatus 1400, a presence or absence of user contact with apparatus 1400, an orientation or an acceleration/deceleration of apparatus 1400, and/or a change in temperature of apparatus 1400. Sensor component 814 may include a proximity sensor configured to detect the presence of nearby objects without any physical contact. Sensor component 814 may also include a light sensor, such as a CMOS or CCD image sensor, for imaging applications. In some embodiments, sensor component 814 may also include an accelerometer sensor, a gyroscope sensor, a magnetic sensor, a pressure sensor, or a temperature sensor.

Communication component 816 is configured to facilitate wired or wireless communications between apparatus 1400 and other devices. Apparatus 1400 can access a wireless network based on a communication standard, such as WIFI, 2G, or 3G, or a combination thereof. In one exemplary embodiment, communication component 816 receives broadcast signals from an external broadcast management system or broadcast associated information, via a broadcast channel. In one exemplary embodiment, communication component 816 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and/or other technologies.

In some embodiments, apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for performing the above described methods.

In some embodiments, a non-transitory computer readable storage medium storing instructions thereon is provided, such as storage component 804 with instructions stored thereon. The instructions are executable by processor 820 in apparatus 1400, for performing the above-described methods. For example, the non-transitory computer-readable storage medium may be a ROM, a RAM, a CD-ROM, a magnetic tape, a floppy disc, an optical data storage device, and the like.

In addition, the instructions stored on the non-transitory computer readable storage medium, when executed by a processor of terminal, may cause the terminal to perform a temperature control method. The method may include determining a present state of a user interface (UI) of the terminal when a present temperature of the terminal reaches a predetermined temperature threshold, and performing a corresponding temperature control strategy on the terminal according to the determined present state of the UI. The present state of the UI may be one of an interacting state and a non-interacting state.

Other embodiments of the disclosure will be apparent to those skilled in the art from consideration of the specification and practice disclosed herein. This application is intended to cover any variations, uses, or adaptations of the disclosure by following the general principles thereof and including known or customary practice in the art. It is intended that the specification and examples be considered as exemplary only, with a true scope and spirit of the disclosure being indicated by the following claims.

It is to be understood that, the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A temperature control method, comprising:
   determining a present state of a user interface of a terminal when a present temperature of the terminal reaches a predetermined temperature threshold, wherein the present state of the user interface is an interacting state or a non-interacting state; and
   performing a corresponding temperature control strategy on the terminal according to the present state of the user interface,
   wherein when the predetermined temperature threshold is a first predetermined temperature threshold, performing the corresponding temperature control strategy on the terminal according to the present state of the user interface includes:
   reducing a screen power consumption of the terminal, and a charging power consumption of the terminal to a predetermined charging power consumption threshold, if the present state of the user interface is the interacting state; and
   closing at least one of application programs running in the terminal according to a priority list of the application programs, if the present state of the user interface is the non-interacting state.

2. The method of claim 1, wherein determining a present state of a user interface of a terminal comprises:
   detecting whether a screen of the terminal is on;
   determining the present state of the user interface as the interacting state if the screen of the terminal is on; and
   determining the present state of the user interface as the non-interacting state if the screen of the terminal is not on.

3. The method of claim 1, wherein determining a present state of a user interface of a terminal comprises:
   detecting whether a screen touch event occurs in the terminal;
   determining the present state of the user interface as the interacting state if the screen touch event occurs in the terminal; and
   determining the present state of the user interface as the non-interacting state if the screen touch event does not occur in the terminal.

4. The method of claim 1, wherein when the present temperature of the terminal reaches a second predetermined threshold higher than the first predetermined threshold, performing the corresponding temperature control strategy on the terminal according to the present state of the user interface comprises:
   reducing the screen power consumption of the terminal and closing a charging function of the terminal, if the present state of the user interface is the interacting state; and
   closing at least one of the application programs running in the terminal according to the priority list of the application programs and reducing a network power consumption of the terminal to a predetermined network power consumption threshold, if the present state of the user interface is the non-interacting state.

5. The method of claim 1, wherein prior to closing at least one of application programs running in the terminal according to a priority list of the application programs, the method further comprises:
   receiving application priority information input; and
   generating the priority list of the application programs according to the application priority information,
   wherein the priority list of the application programs is configured to indicate a priority order of the application programs, and at least one of the application programs running in the terminal is closed in an order from a low priority to a high priority.

6. The method of claim 1, wherein reducing a screen power consumption of the terminal comprises at least one of:
   reducing a screen brightness of the terminal to a predetermined screen brightness; and
   closing a screen key light of the terminal.

7. A temperature control apparatus, comprising:
   a processing component; and a storage component configured to store instructions executable by the processing component;

wherein the processing component is configured to:

determine a present state of a user interface of a terminal when a present temperature of the terminal reaches a predetermined temperature threshold, the present state of the user interface being an interacting state or a non-interacting state; and perform a corresponding temperature control strategy on the terminal according to the present state of the user interface, wherein when the predetermined temperature threshold is a first predetermined temperature threshold, the processing component is further configured to perform the corresponding temperature control strategy on the terminal according to the present state of the user interface by:

reducing a screen power consumption of the terminal, and a charging power consumption of the terminal to a predetermined charging power consumption threshold, if the present state of the user interface is the interacting state, and closing at least one of application programs running in the terminal according to a priority list of the application programs, if the present state of the user interface is the non-interacting state.

8. The apparatus of claim 7, wherein the processing component is further configured to determine a present state of a user interface of a terminal by:

detecting whether a screen of the terminal is on;

determining the present state of the user interface as the interacting state if the screen of the terminal is on; and determining the present state of the user interface as the non-interacting state if the screen of the terminal is not on.

9. The apparatus of claim 7, wherein the processing component is further configured to determine a present state of a user interface of a terminal by:

detecting whether a screen touch event occurs in the terminal;

determining the present state of the user interface as the interacting state if the screen touch event occurs in the terminal; and determining the present state of the user interface as the non-interacting state if the screen touch event does not occur in the terminal.

10. The apparatus of claim 7, wherein when the present temperature of the terminal reaches a second predetermined temperature threshold higher than the first predetermined temperature threshold, the processing component is further configured to perform the corresponding temperature control on the terminal according to the present state of the user interface by:

reducing the screen power consumption of the terminal and closing a charging function of the terminal, if the present state of the user interface is the interacting state; and closing at least one of the application programs running in the terminal according to the priority list of the application programs and reducing a network power consumption of the terminal to a predetermined network power consumption, if the present state of the user interface is the non-interacting state.

11. The apparatus of claim 7, wherein prior to closing at least one of the application programs running in the terminal according to the priority list of the application programs, the processing component is further configured to:

receive application priority information input; and generate the priority list of the application programs according to the application priority information, wherein the priority list of the application programs is configured to indicate a priority order of the application programs, and at least one of the application programs running in the terminal is closed in an order from a low priority to a high priority.

12. The apparatus of claim 7, wherein the processing component is further configured to reduce the screen power consumption of the terminal by at least one of:

reducing a screen brightness of the terminal to a predetermined screen brightness; and closing a screen key light of the terminal.

13. A non-transitory computer-readable storage medium having stored therein instructions that, when executed by a processor of an apparatus, cause the apparatus to perform a temperature control method, the method comprising:

determining a present state of a user interface of a terminal when a present temperature of the terminal reaches a predetermined temperature threshold, wherein the present state of the user interface is an interacting state or a non-interacting state; and performing a corresponding temperature control strategy on the terminal according to the present state of the user interface, wherein when the predetermined temperature threshold is a first predetermined temperature threshold, performing the corresponding temperature control strategy includes:

reducing a screen power consumption of the terminal, and a charging power consumption of the terminal to a predetermined charging power consumption threshold, if the present state of the user interface is the interacting state; and closing at least one of application programs running in the terminal according to a priority list of the application programs, if the present state of the user interface is the non-interacting state.

14. The non-transitory computer-readable storage medium of claim 13, wherein determining a present state of a user interface of a terminal comprises:

detecting whether a screen of the terminal is on;

determining the present state of the user interface as the interacting state if the screen of the terminal is on; and determining the present state of the user interface as the non-interacting state if the screen of the terminal is not on.

15. The non-transitory computer-readable storage medium of claim 13, wherein determining a present state of a user interface of a terminal comprises:

detecting whether a screen touch event occurs in the terminal;

determining the present state of the user interface as the interacting state if the screen touch event occurs in the terminal; and determining the present state of the user interface as the non-interacting state if the screen touch even does not occur.

16. The non-transitory computer-readable storage medium of claim 13, wherein when the present temperature of the terminal reaches a second predetermined temperature threshold higher than the first predetermined temperature threshold, performing the corresponding temperature control strategy on the terminal according to the present state of the user interface comprises:

reducing the screen power consumption of the terminal and closing a charging function of the terminal, if the present state of the user interface is the interacting state; and closing at least one of the application programs running in the terminal according to the priority list of the application programs and reducing a network power consumption of the terminal to a predetermined network power consumption, if the present state of the user interface is the non-interacting state.

17. The non-transitory computer-readable storage medium of claim 13, wherein prior to closing at least one of the application programs running in the terminal according to the priority list of the application programs, the method further comprises:

receiving application priority information input; and generating the priority list of the application programs according to the application priority information, wherein the priority list of the application programs is configured to indicate a priority order of the application programs, and at least one of the application programs running in the terminal is closed in an order from a low priority to a high priority.

\* \* \* \* \*